United States Patent
Sethi et al.

(10) Patent No.: US 12,271,728 B2
(45) Date of Patent: Apr. 8, 2025

(54) SYSTEM AND METHOD TO IDENTIFY AND IMPROVE CONNECTION ISSUES

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/173,927

(22) Filed: Feb. 24, 2023

(65) Prior Publication Data

US 2024/0289107 A1    Aug. 29, 2024

(51) Int. Cl.
*G06F 8/65*        (2018.01)
*H04L 41/046*      (2022.01)
*H04L 43/0811*     (2022.01)
*H04L 43/16*       (2022.01)

(52) U.S. Cl.
CPC .............. *G06F 8/65* (2013.01); *H04L 41/046* (2013.01); *H04L 43/0811* (2013.01); *H04L 43/16* (2013.01)

(58) Field of Classification Search
CPC .......................... G06F 8/60–66; H04L 43/0811
USPC .................................................. 717/168–178
See application file for complete search history.

(56) References Cited

U.S. PATENT DOCUMENTS

| | | | |
|---|---|---|---|
| 7,590,981 B2 | 9/2009 | Gupta et al. | |
| 8,078,448 B1 | 12/2011 | Wohlberg et al. | |
| 9,086,941 B1 | 7/2015 | Siegel | |
| 2004/0078711 A1* | 4/2004 | King | H05K 7/1489 714/43 |
| 2007/0100850 A1* | 5/2007 | Choe | G06F 11/0751 |
| 2010/0306366 A1* | 12/2010 | Cragun | H04L 67/02 709/224 |
| 2011/0113224 A1 | 5/2011 | Isshiki et al. | |
| 2012/0110150 A1 | 5/2012 | Kosuru | |
| 2012/0254370 A1 | 10/2012 | Bacher | |

(Continued)

FOREIGN PATENT DOCUMENTS

JP        2004280292 A   *   10/2004

OTHER PUBLICATIONS

Multicast, Wikipedia, 2021, 6 pages, [retrieved on Jan. 10, 2025], Retrieved from the Internet: <URL:https://web.archive.org/web/20211224230914//https://en.wikipedia.org/wiki/Multicast>.*

*Primary Examiner* — Geoffrey R St Leger
(74) *Attorney, Agent, or Firm* — Chamberlain, Hrdlicka, White, Williams & Aughtry; Aly Z. Dossa (57) ABSTRACT

A method for providing enhanced reliability for data streams includes identifying an upgrade request sent by a client device to an upgrade node. The method also includes monitoring a response to the upgrade request from the upgrade node to the client device. The method further includes determining that the response is indicative of a connection issue between the client device and the upgrade node. Moreover, the method includes identifying, based on determining that the response is indicative of the connection issue, a support agent associated with the client device. In addition, the method includes providing an alert to the support agent with an indication that there is the connection issue between the client device and the upgrade node.

12 Claims, 6 Drawing Sheets

(56) References Cited

U.S. PATENT DOCUMENTS

| | | | |
|---|---|---|---|
| 2013/0067288 A1* | 3/2013 | Louie | G06F 11/1471 |
| | | | 709/224 |
| 2015/0278219 A1 | 10/2015 | Phipps | |
| 2015/0282217 A1 | 10/2015 | Kim | |
| 2016/0127976 A1 | 5/2016 | Kumar | |
| 2016/0162280 A1 | 6/2016 | Murayama et al. | |
| 2018/0062820 A1 | 3/2018 | Simon | |
| 2018/0113728 A1 | 4/2018 | Musani et al. | |
| 2018/0152341 A1 | 5/2018 | Maeda et al. | |
| 2018/0275982 A1 | 9/2018 | Hunt et al. | |
| 2020/0029179 A1 | 1/2020 | Basra | |
| 2020/0104113 A1 | 4/2020 | Grill et al. | |
| 2020/0145310 A1* | 5/2020 | Lodhia | H04L 67/568 |
| 2020/0156243 A1 | 5/2020 | Ghare et al. | |
| 2023/0045170 A1 | 2/2023 | Tran Thai | |

* cited by examiner

SYSTEM AND METHOD TO IDENTIFY AND IMPROVE CONNECTION ISSUES

BACKGROUND

Computing devices often exist in environments that include many such devices (e.g., servers, virtualization environments, storage devices, network devices, etc.). Such environments may, from time to time, in whole or in part, require being twinned and/or migrated (e.g., moved from one set of devices to another). Such twinning and/or migrations often require large amounts of investigation, coordination, time, and manual steps to be performed by any number of system administrators.

SUMMARY

In general, embodiments described herein relate to a method for providing enhanced reliability for data streams. The method includes identifying an upgrade request sent by a client device to an upgrade node. The method also includes monitoring a response to the upgrade request from the upgrade node to the client device. The method further includes determining that the response is indicative of a connection issue between the client device and the upgrade node. Moreover, the method includes identifying, based on determining that the response is indicative of the connection issue, a support agent associated with the client device. In addition, the method includes providing an alert to the support agent with an indication that there is the connection issue between the client device and the upgrade node.

In general, embodiments described herein relate to a non-transitory computer readable medium including computer readable program code, which when executed by a computer processor enables the computer processor to perform a method for providing enhanced reliability for data streams, the method including identifying an upgrade request sent by a client device to an upgrade node. The method also includes monitoring a response to the upgrade request from the upgrade node to the client device. The method further includes determining that the response is indicative of a connection issue between the client device and the upgrade node. Moreover, the method includes identifying, based on determining that the response is indicative of the connection issue, a support agent associated with the client device. In addition, the method includes providing an alert to the support agent with an indication that there is the connection issue between the client device and the upgrade node.

In general, embodiments described herein relate to an upgrade monitoring system for providing enhanced reliability for data streams that includes a processor programmed to identify an upgrade request sent by a client device to an upgrade node. The processor is also programmed to monitor a response to the upgrade request from the upgrade node to the client device. The processor is further programmed to determine that the response is indicative of a connection issue between the client device and the upgrade node. Moreover, the processor is programmed to identify, based on determining that the response is indicative of the connection issue, a support agent associated with the client device. In addition, the processor is programmed to provide an alert to the support agent with an indication that there is the connection issue between the client device and the upgrade node.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

The following describes one or more embodiments.

Figure 1:
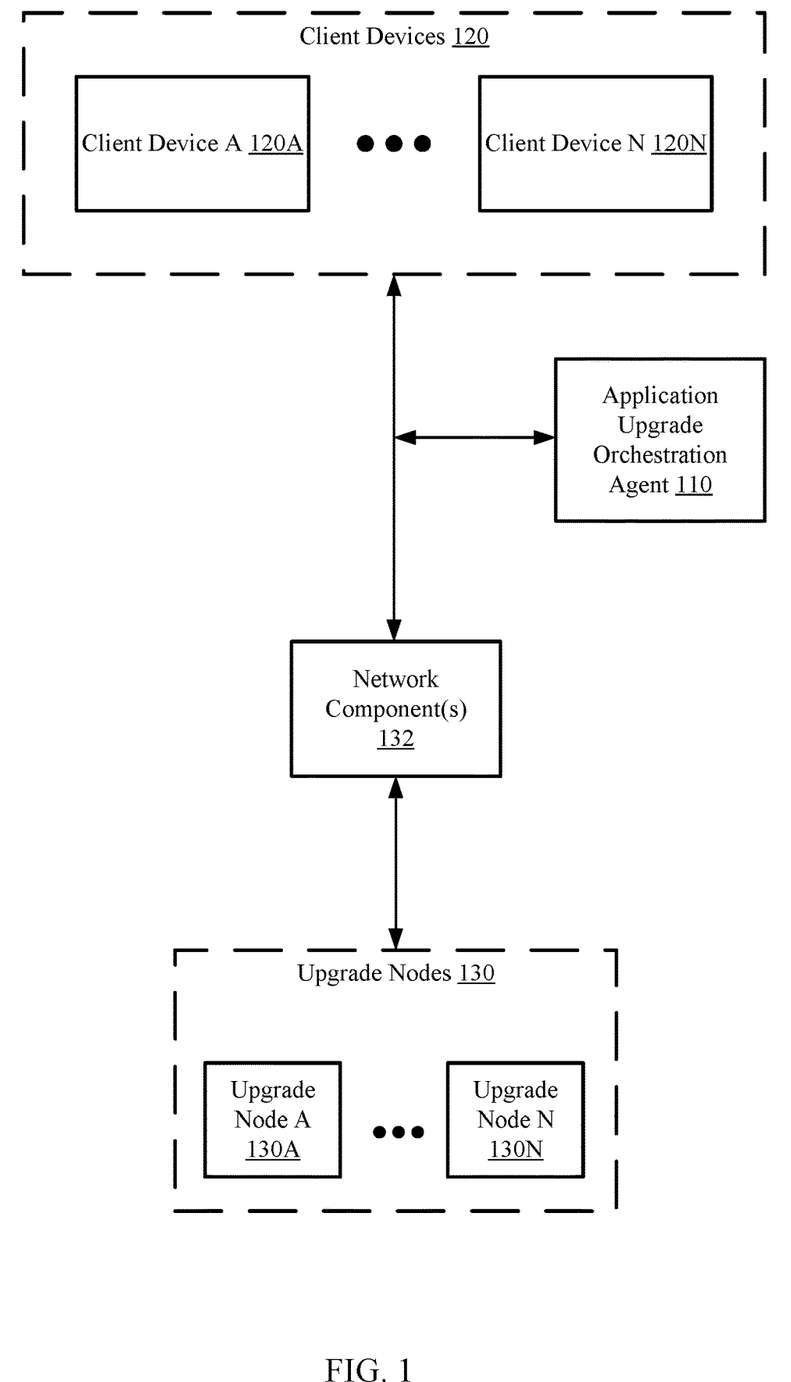
FIG. 1 shows a diagram of a system in accordance with one or more embodiments of the invention.

FIG. 1 shows an example system in accordance with one or more embodiments of the invention. The system includes an application upgrade orchestration agent (110), client devices (120A-120N), upgrade nodes (130A-130N), and one or more network components (132). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, client devices (120) may represent any physical device or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network. Further, in providing an execution environment for any computer programs installed thereon, client devices (120) may include and allocate various resources (e.g., computer processors, memory, storage, virtualization, network bandwidth, etc.), as needed, to the computer programs and the tasks (or processes) instantiated thereby. One of ordinary skill will appreciate that client devices (120) may perform other functionalities without departing from the scope of the invention.

In one or more embodiments of the invention, each of the client devices (120A-120N) may include applications. The applications may be logical entities executed using computing resources (not shown) of the client devices (120A-120N). Each of the applications may be performing similar or different processes. In one or more embodiments of the invention, the applications provide services to users, e.g., clients (not shown). For example, the applications may host components. The components may be, for example, instances of databases, email servers, and/or other components. The applications may host other types of components without departing from the invention. An application may be executed on one or more client devices (120A-120N) as instances of the application. In one or more embodiments of the invention, the applications are implemented as computer instructions, e.g., computer code, stored on a persistent storage that when executed by a processor(s) of a computing device cause the computing device to provide the functionality of the applications described throughout this application.

The applications may be upgraded based on newer versions available for download from the upgrade nodes (130A-130N). The client devices (120A-120N) communicate with the upgrade nodes (130A-130N) via one or more network components (132) to download the application upgrades. The downloading of application upgrades may be facilitated by the application upgrade orchestration agent (110). The application upgrade orchestration agent (110) monitors the communication between the client devices (120A-120N) and the upgrade nodes (130A-130N) and may perform the methods of FIGS. 2 and 4 to facilitate and/or improve the downloading of the application upgrades from the upgrade nodes (130A-130N) to the client devices (120A-120N). As used herein, the application upgrade includes any file that is used to change the associated application in whole or in part.

Figure 4:
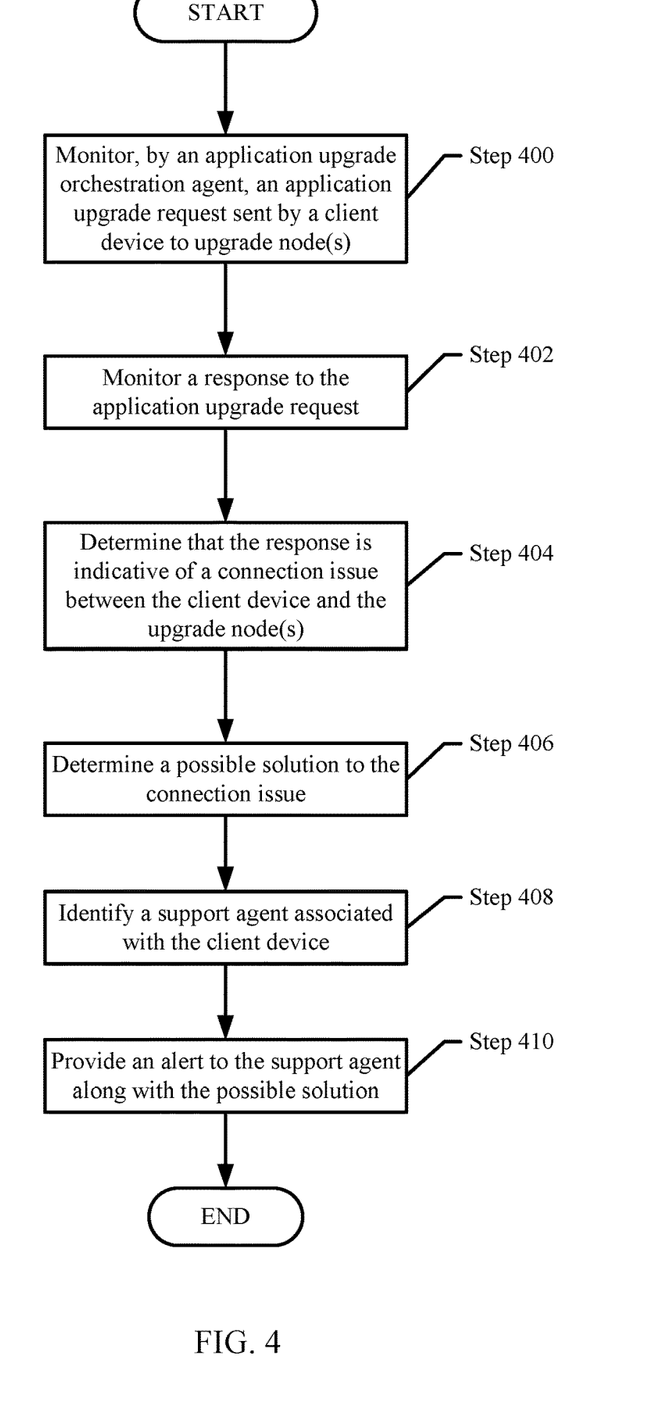
FIG. 4 shows a flowchart of a method for providing enhanced reliability for data streams in accordance with one or more embodiments of the invention.
Figure 5:
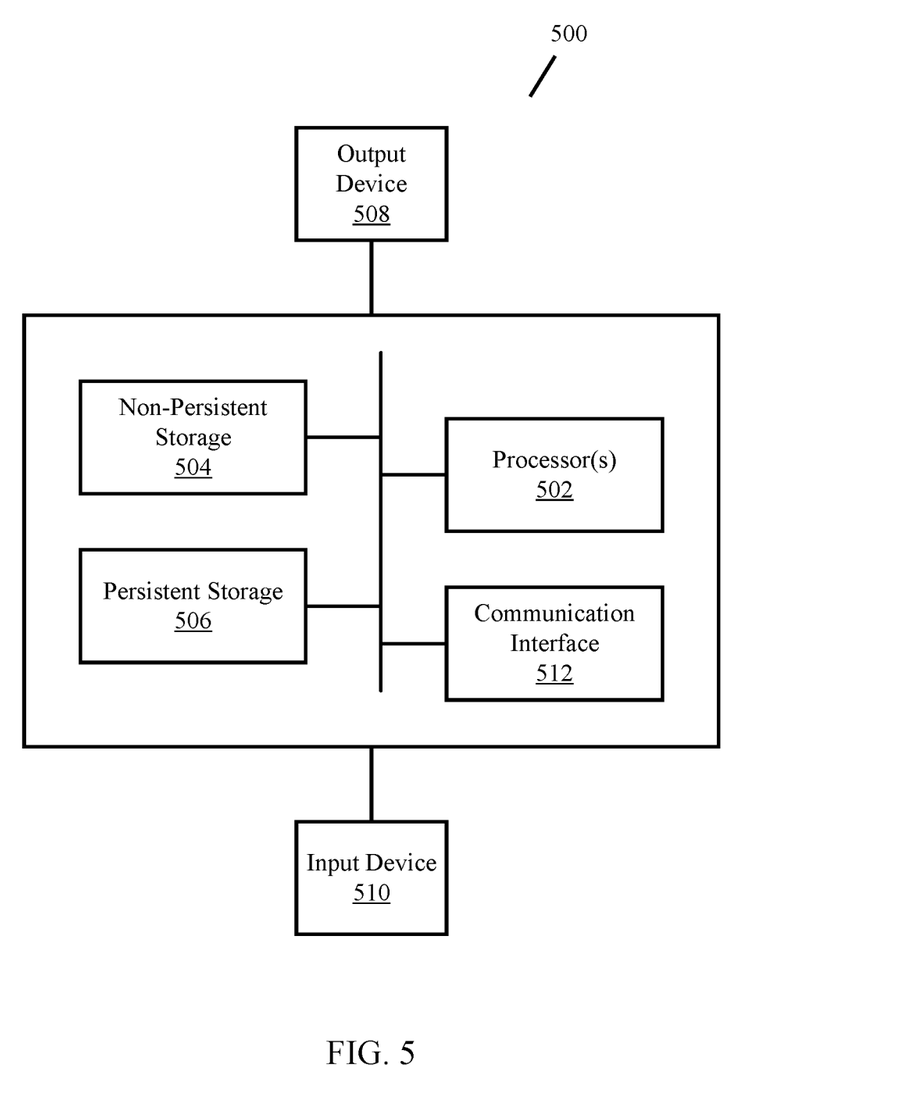
FIG. 5 shows a computing system in accordance with one or more embodiments of the invention.

In one or more embodiments of the invention, the application upgrade orchestration agent (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application upgrade orchestration agent (110) described throughout this application and/or all, or a portion thereof, of the methods illustrated in FIGS. 2 and 4.

In one or more embodiments of the invention, the application upgrade orchestration agent (110) is implemented as a logical device. The logical device may utilize the computing resources of any number of computing devices and thereby provide the functionality of the application upgrade orchestration agent (110) described throughout this application and/or all, or a portion thereof, of the methods illustrated in FIGS. 2 and 4.

In one or more embodiments of the invention, the components shown in FIG. 1 may operatively connect to one another through a network (e.g., a local area network (LAN), a wide area network (WAN) such as the Internet, a mobile network, etc.) via one or more network component(s) (132). The network may be implemented using any combination of wired and/or wireless connections. Further, the network may encompass various interconnected, network components (132) (or systems) (e.g., switches, routers, gateways, etc.) that may facilitate communications between the above-mentioned system components. Moreover, the components may communicate with one another using any combination of wired and/or wireless communication protocols, including internet protocol (IP). Further, the components may communicate by multicasting digital data between the components. As will be described in greater detail below, the upgrade nodes (130A-130N) may send digital data using multicast protocols to the network component(s) (132) which, in turn, may route the digital data to a number of client devices (120A-120N) in parallel. As such, multicasting enables one upgrade node (130A-130N) to send digital data to many client devices (120A-120N) using a single stream of digital data.

In one or more embodiments of the invention, upgrade nodes (130A-130N) may represent any physical device or computing system designed and configured to receive, generate, process, store, and/or transmit digital data, as well as to provide digital data to other devices (e.g., client devices (120A-120N)) in response to requests sent by the other devices. The computer programs (not shown) may, for example, implement large-scale and complex data processing; or implement one or more services offered locally or over the network. One of ordinary skill will appreciate that upgrade nodes (130A-130N) may perform other functionalities without departing from the scope of the invention. Further, each of the upgrade nodes (130A-130N) may each contain a portion of or all of an application upgrade such that one client device (120A-120N) may simultaneously download different portions of the application upgrade from different upgrade nodes (130A-130N).

Improving Turnaround Time for Providing Upgrades

In previous implementations of providing upgrades, when an application upgrade becomes available to client devices, each client device requests the application upgrade. In response, the upgrade nodes send the application upgrade to each client device in a separate data stream for each client device. This may cause a significant burden on the upgrade nodes, which may also cause the data streams to transmit data at a relatively slow rate. This slow rate causes the application upgrades to become slower and more unreliable. The method described in FIG. 2 may significantly reduce the amount of time to complete a download of an application upgrade by grouping upgrade requests from client devices, logically dividing the data associated with the upgrade requests, and utilizing multicasting to transmit the data. Embodiments of the invention may include additional or other advantages (or benefits) in addition to those discussed above.

Figure 2:
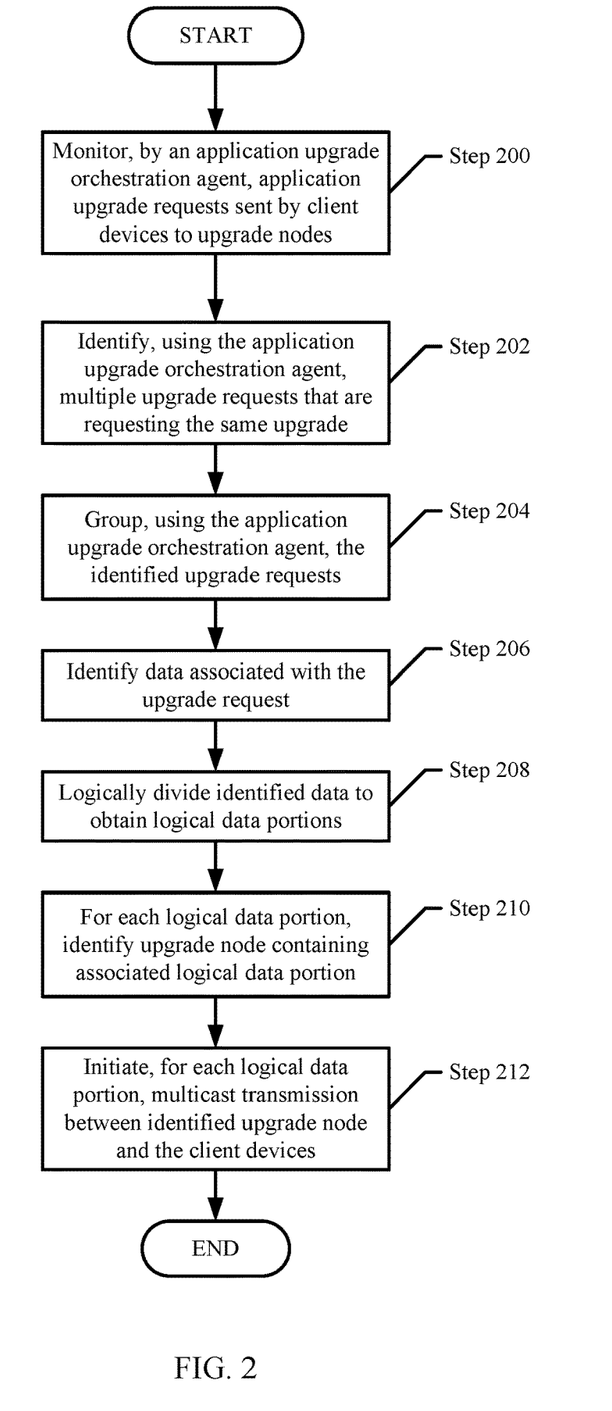
FIG. 2 shows a flowchart of a method for providing upgrades accordance with one or more embodiments of the invention.

Turning to FIG. 2, FIG. 2 shows a flowchart describing a method for providing application upgrades in accordance with one or more embodiments disclosed herein. The method may be performed by, for example, the application upgrade orchestration agent (110, FIG. 1).

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, an application upgrade orchestration agent (e.g., 110, FIG. 1) monitors application upgrade requests sent by client devices (e.g., 120A-120N, FIG. 1) to upgrade nodes (e.g., 130A-130N). The application upgrade orchestration agent may monitor all traffic between the client devices and the upgrade nodes and identify which portions of the traffic are associated with upgrade requests. In one embodiment, the application upgrade orchestration agent may identify the upgrade requests based, at least in part, on route-to-service, request type, route-path, response type, response size, and/or other information indicative of an upgrade request. In one embodiment, the application upgrade orchestration agent monitors the traffic between the client devices and the upgrade nodes via packet sniffing. Further, the upgrade requests may be for a single application upgrade or for multiple application upgrades. In instances in which a client device sends an upgrade request for multiple application upgrades, the application upgrade orchestration agent may bundle the multiple application upgrades into a single upgrade request.

In step 202, the application upgrade orchestration agent identifies multiple upgrade requests that are requesting the same upgrade. The application upgrade orchestration agent may identify that the multiple upgrade requests are for the same upgrade based, at least in part, on route-to-service, request type, route-path, response type, response size, and/or other information indicative of an upgrade request.

In step 204, the application upgrade orchestration agent groups the upgrade requests identified in step 202 into a combined upgrade request. The group (or grouping) may include any portion of the upgrade requests identified in step 202. Further, the application upgrade orchestration agent may group portions of the identified upgrade requests into any number of groups. In one embodiment, the application upgrade orchestration agent groups the requests based, at least in part, on route-to-service, request type, and/or route-path. Further, the application upgrade orchestration agent may group the upgrade requests until the application upgrade orchestration agent determines that a threshold value has been exceeded. In one embodiment, the threshold value is a number of upgrade requests, which may be any suitable number. In one embodiment, the threshold value is an amount of time (e.g., any time under one minute) after identifying a first one of the upgrade requests. For example, upon identifying a first one of the upgrade requests, the application upgrade orchestration agent may group all upgrade requests identified within the following five seconds. Other mechanisms and/or heuristics for grouping the upgrade requests may be implemented without departing from the invention.

In step 206, the application upgrade orchestration agent identifies data associated with the upgrade request. The upgrade request is for specific data that is an upgrade to an application. As described above, the data may include one or more files corresponding to one or more application upgrades.

In step 208, the application upgrade orchestration agent logically divides the identified data to obtain logical data portions. For example, the application upgrade orchestration agent may logically divide the data into two, three, four or more logical data portions where the sum total of the logical data portions forms the identified data.

In step 210, for each logical data portion created in step 208, the application upgrade orchestration agent identifies an upgrade node containing the associated logical data portion. For example, if four logical data portions were created, a first upgrade node may contain all of the data logical portions and a second upgrade node may contain the second and third logical data portions. In this example, the application upgrade orchestration agent may identify the first upgrade node for the first and fourth logical data portions and the second upgrade node for the second and third logical data portions, even though the first upgrade node contains all four logical data portions. In this manner, the burden of providing the application upgrade is spread amongst the available upgrade nodes. Further, the upgrade nodes may also be identified based on their available resources, the number of upgrade requests being grouped together, and/or the network properties of the upgrade nodes (e.g., the available bandwidth, latency between the upgrade node and the client devices, etc.).

In step 212, for each logical data portion, the application upgrade orchestration agent initiates a multicast transmission from each of the identified upgrade nodes and the client devices. In doing so, the application upgrade orchestration agent may send a request for each logical data portion to the associated upgrade node that provides sufficient information to enable the upgrade node to send the associated logical data portions to all of the client devices via multicast transmission. Further, the application upgrade orchestration agent may initiate the multicast transmission such that two or more of the upgrade nodes send the associated logical data portions to all of the client devices simultaneously, thereby enabling the client devices to download multiple data portions simultaneously and further reducing the time to complete a download of an upgrade.

The method may end after step 212.

Example

Figure 3A:
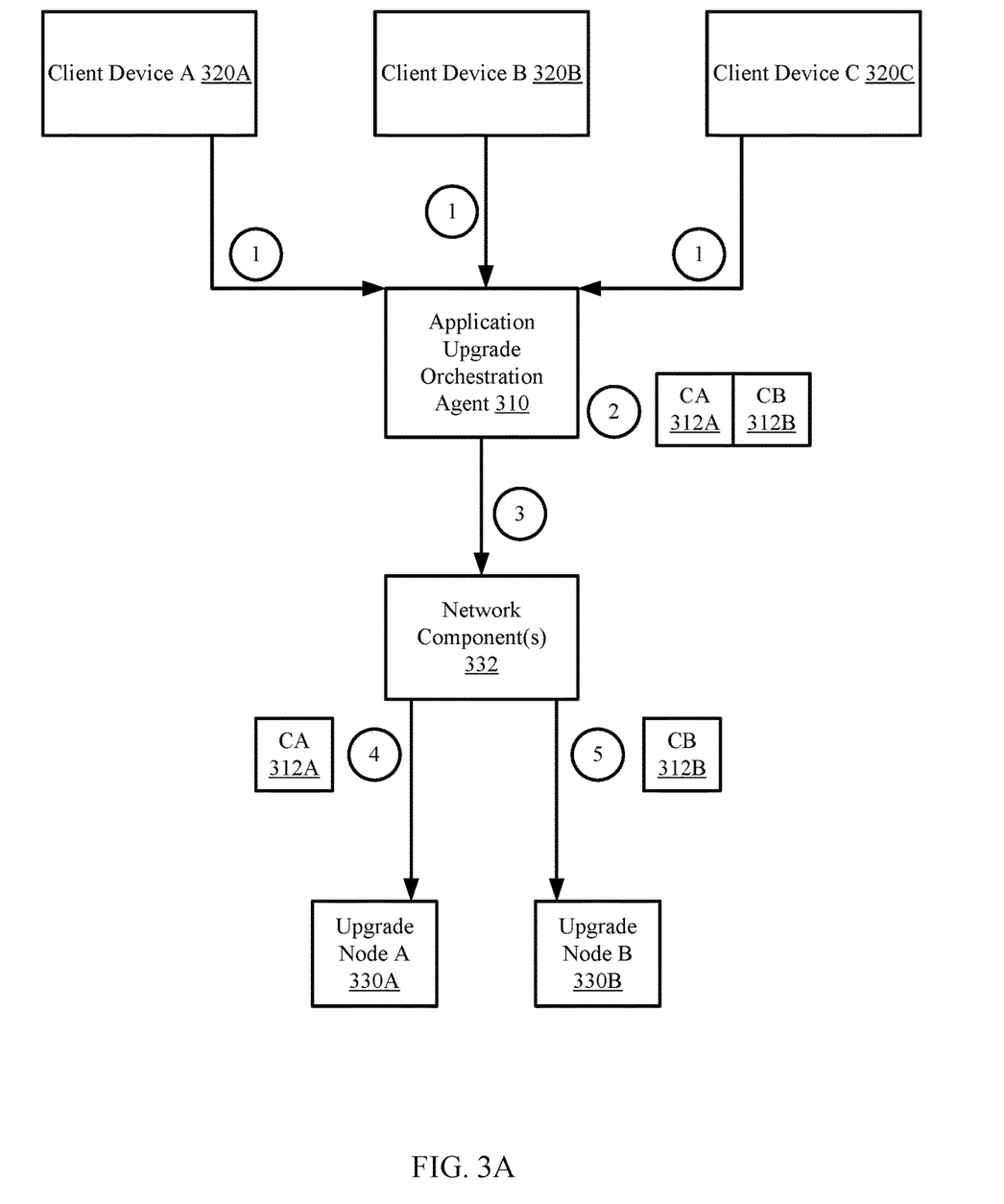
FIGS. 3A and 3B illustrate portions of an example of the method of FIG. 2 in accordance with one or more embodiments of the invention.
Figure 3B:
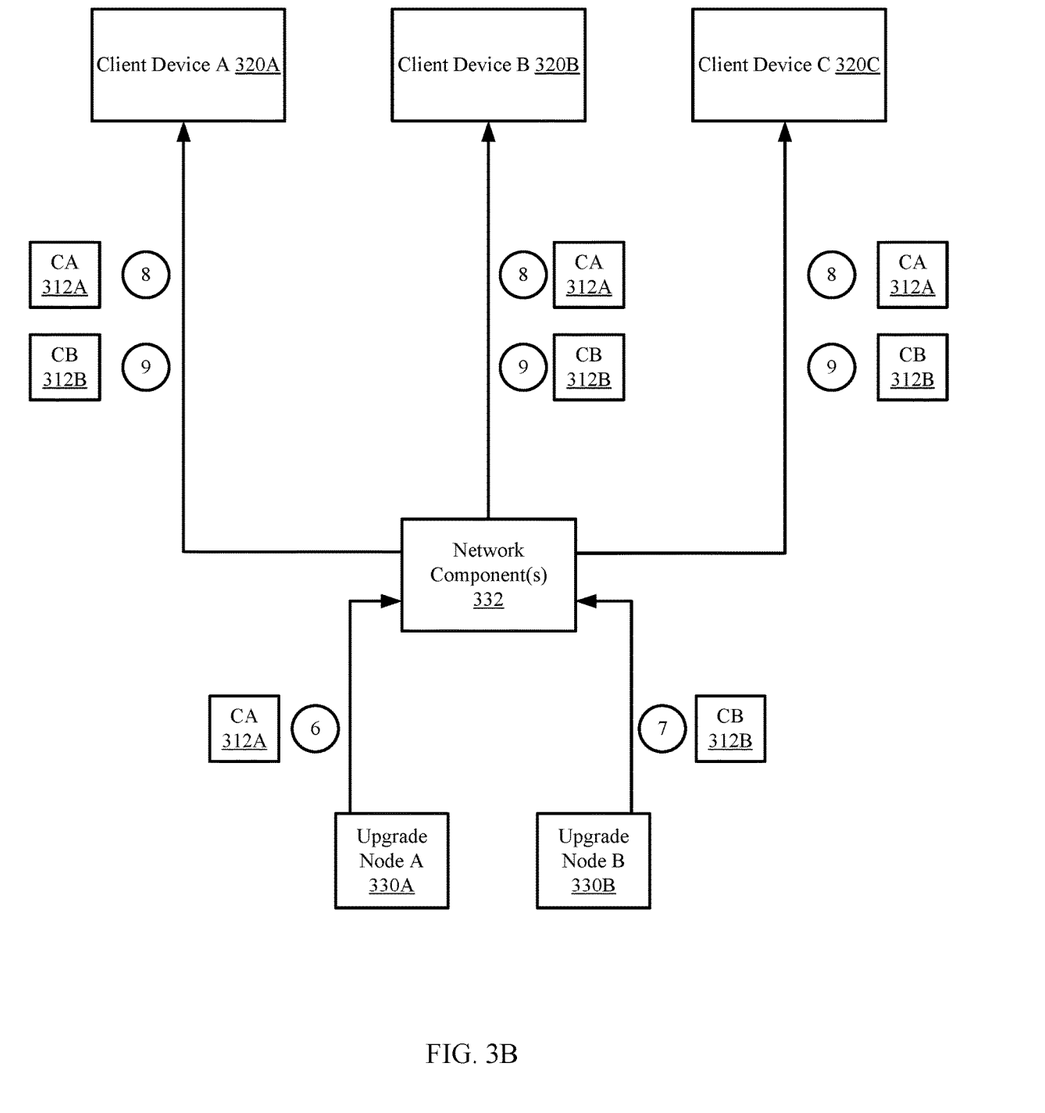

FIGS. 3A and 3B illustrate an example of the method of FIG. 2 to better understand the performance of the method. It should be understood that the example shown in FIGS. 3A and 3B is merely a single example is not intended to limit the invention and is independent from any other examples discussed in this application. Turning to the example, consider a scenario in which multiple client devices are requesting the same upgrade at or around the same time.

Turning to the example, FIG. 3A shows a diagram of an example system. For the sake of brevity, not all components shown in FIG. 1 are illustrated in FIG. 3A. The example system may include three client devices (320A, 320B, 320C). Each of the client devices (320A, 320B, 320C) sends a request for the same application upgrade [1]. The application upgrade orchestration agent (310) identifies that the requests sent by the client devices (320A, 320B, 320C) are each for the same upgrade file. Then, the application upgrade orchestration agent (310) groups the identified upgrade requests together. The application upgrade orchestration agent (310) also identifies the data associated with upgrade requests. Further, the application upgrade orchestration agent (310) logically divides the data associated with the upgrade request. In the present embodiment, the application upgrade orchestration agent (310) logically divides the data into two logical data portions, CA (312A) and CB (312B) [2].

Then, the application upgrade orchestration agent (310) identifies upgrade nodes (330A, 330B) associated with the logical data portions. In the present embodiment, the application upgrade orchestration agent (310) identifies upgrade node A (330A) as being associated with logical data portion CA (312A) and upgrade node B (330B) as being associated with logical data portion CB (312B). Then, the application upgrade orchestration agent (310) initiates a multicast transmission from the upgrade nodes (330A, 330B) and the client devices (320A, 320B, 320C). In doing so, the application upgrade orchestration agent (310) sends, via network component(s) (332), requests for each of the logical data portions (312A, 312B) to the respective upgrade nodes (330A, 330B) with an indication to use multicast transmission with the client devices (320A, 320B, 320C) as the destinations [3]. In one or more embodiments, the application upgrade orchestration agent (310) may send the requests directly to the upgrade nodes (330A, 330B). The network component(s) (332) then route the requests to the respective upgrade nodes (330A, 330B) with a first request for the first data portion CA (312A) being sent to the first upgrade node A (330A) [4] and a second request for the second data portion CB (312B) being sent to the second upgrade node B (330B) [5].

Turning to FIG. 3B, the example continues. In response to receiving the request at [4], the first upgrade node A (330A) sends the first data portion CA (312A) to the network component(s) (332) [6] with instructions to multicast the first data portion CA (312A) to all of the client devices (330A, 330B, 330C). The first data portion CA (312A) is then received by the network component(s) (332) and multicast by the network component(s) (332) [8] to the client devices (330A, 330B, 330C).

Similarly, in response to receiving the request at [5], the second upgrade node B (330B) sends the second data portion CB (312B) to the network component(s) (332) [7] with instructions to multicast the second data portion CB (312B) to all of the client devices (330A, 330B, 330C). The second data portion CB (312B) is then received by the network component(s) (332) and multicast by the network component(s) (332) [9] to the client devices (330A, 330B, 330C). The multicast transmission also includes instructions to enable the client devices (330A, 330B, 330C) to reconstruct the upgrade file from the data portions CA (312A) and CB (312B). Further, the transmission of the data portions CA (312A) and CB (312B) may occur simultaneously.

End Example

Improving Upgrade Reliability

In previous implementations of providing upgrades, when an application upgrade becomes available to client devices, each client device requests the application upgrade. In response, the upgrade nodes send the application upgrade to each client device in a separate data stream for each client device. This may cause a significant burden on the upgrade nodes, which may also cause the data streams to transmit data at a relatively slow rate. This slow rate causes the application upgrades to become slower and more unreliable. The method described in FIG. 4 may identify connection issues between upgrade nodes and client devices and provide alerts and recommendations to support agents associated with the client devices, thereby improving the ability for a support agent to recognize and solve issues.

Turning to FIG. 4, FIG. 4 shows a flowchart describing a method for improving upgrade reliability in accordance with one or more embodiments disclosed herein. The method may be performed by, for example, the application upgrade orchestration agent (110, FIG. 1).

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 400, an application upgrade orchestration agent (e.g., 110, FIG. 1) monitors application upgrade requests sent by client devices (e.g., 120A-120N, FIG. 1) to upgrade nodes (e.g., 130A-130N). The application upgrade orchestration agent may monitor all traffic between the client devices and the upgrade nodes and identify which portions of the traffic are associated with upgrade requests. In one embodiment, the application upgrade orchestration agent may identify the upgrade requests based, at least in part, on route-to-service, request type, route-path, response type, response size, and/or other information indicative of an upgrade request. In one embodiment, the application upgrade orchestration agent monitors the traffic between the client devices and the upgrade nodes via packet sniffing. Further, the upgrade requests may be for a single application upgrade or for multiple application upgrades.

In step 402, the application upgrade orchestration agent monitors a response to the application upgrade request identified in step 400. The monitoring may include monitoring a rate of data transfer, a length of time the stream has been established, a length of time between a request and a corresponding response, configuration settings on the client device and/or upgrade node, and/or any other information indicative of the quality of the connection between the upgrade node and the client device.

In step 404, the application upgrade orchestration agent determines that the response is indicative of a connection issue between the upgrade node and the client device. Determining that there is a connection issue may be based on any quality indicative of connection quality, including a rate of data transfer, a length of time the stream has been established, a length of time between a request and a corresponding response, and/or configuration settings on the client device and/or upgrade node. For example, the rate of data transfer may be below a threshold value, the length of time the stream has been established may be above a threshold value, the length of time between a request and a corresponding response may be above a threshold value, and/or there is a configuration issue on the client device and/or upgrade node.

In step 406, the application upgrade orchestration agent determines a possible solution to the connection issue. In one or more embodiments, the application upgrade orchestration agent may send a script to the client device and/or the upgrade node to determine the network configuration settings of the client device and/or the upgrade node. For example, the script may run on the client device and/or upgrade node to determine whether the client device and/or upgrade node has multicasting enabled and then send the results back to the application upgrade orchestration agent. If the results indicate that the client device and/or upgrade node are not multicast enabled, then the application upgrade orchestration agent determines that the possible solution is to enable multicasting on the client device and/or upgrade node. In one or more embodiments, the application upgrade orchestration agent may monitor the route path of the response and determine whether the route path includes a router that is multicast enabled. If the application upgrade orchestration agent determines that the route path did not include a multicast enabled router, then the application upgrade orchestration agent determines that the possible solution includes sending the response to at least one multicast enabled router in the response route path.

In step 408, the application upgrade orchestration agent identifies a support agent associated with the client device. While monitoring the upgrade requests between the client device and the upgrade node, the application upgrade orchestration agent may identify the client device. Further, there may be a database, lookup table, group identification, or other data structure that provides a support agent associated with the client device. Thus, the application upgrade orchestration agent may utilize the data structure to identify the support agent associated with the client device. The support agent information may include the name of the support agent along with contact information (e.g., email address, phone number, social media handle, etc.) for the support agent such that the application upgrade orchestration agent can send a communication to the support agent.

In step 410, the application upgrade orchestration agent provides an alert to the support agent along with the possible solution. The alert indicates that there is a connection issue between the upgrade node and the client device along with which client device is experiencing the connection issue. Further, as described above, the application upgrade orchestration agent may determine a possible solution to the connection issue. The application upgrade orchestration agent may also provide the possible solution to the support agent with the alert such that the support agent may able to quickly solve the connection issue between the client device and the upgrade node. Using this method, the support agent may identify the connection issue and fix the connection issue in a more timely manner, thereby improving the experience of a user of the client device.

The method may end following step 410.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many diverse types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for providing enhanced reliability for data streams, the method comprising:

identifying an upgrade request sent by a client device to an upgrade node;

monitoring a response to the upgrade request from the upgrade node to the client device;

determining that the response is indicative of a connection issue between the client device and the upgrade node;

identifying, based on determining that the response is indicative of the connection issue, a support agent associated with the client device; and providing an alert to the support agent with an indication that there is the connection issue between the client device and the upgrade node, wherein determining that there is the connection issue comprises determining that the upgrade node is multicast enabled and that the client device is not multicast enabled; and wherein providing the alert comprises providing a recommendation to the support agent to enable multicasting on the client device.

2. The method of claim 1, wherein determining that the upgrade node is multicast enabled comprises determining that the upgrade node is using an internet protocol (IP) address reserved for multicasting.

3. The method of claim 2, wherein determining that the client device is not multicast enabled is based on receiving a response to executing a network configuration command on the client device.

4. The method of claim 1, wherein identifying the support agent is based on a group identification associated with the client device.

5. A non-transitory computer readable medium comprising computer readable program code, which when executed by a computer processor enables the computer processor to perform a method for providing enhanced reliability for data streams, the method comprising:

identifying an upgrade request sent by a client device to an upgrade node;

monitoring a response to the upgrade request from the upgrade node to the client device;

determining that the response is indicative of a connection issue between the client device and the upgrade node;

identifying, based on determining that the response is indicative of the connection issue, a support agent associated with the client device; and providing an alert to the support agent with an indication that there is the connection issue between the client device and the upgrade node, wherein determining that there is the connection issue comprises determining that the upgrade node is multicast enabled and that the client device is not multicast enabled; and wherein providing the alert comprises providing a recommendation to the support agent to enable multicasting on the client device.

6. The non-transitory computer readable medium of claim 5, wherein determining that the upgrade node is multicast enabled comprises determining that the upgrade node is using an internet protocol (IP) address reserved for multicasting.

7. The non-transitory computer readable medium of claim 6, wherein determining that the client device is not multicast enabled is based on receiving a response to executing a network configuration command on the client device.

8. The non-transitory computer readable medium of claim 5, wherein identifying the support agent is based on a group identification associated with the client device.

9. An upgrade monitoring system for providing upgrades, comprising:

a processor programmed to:

identify an upgrade request sent by a client device to an upgrade node;

monitor a response to the upgrade request from the upgrade node to the client device;

determine that the response is indicative of a connection issue between the client device and the upgrade node;

identify, based on determining that the response is indicative of the connection issue, a support agent associated with the client device; and provide an alert to the support agent with an indication that there is the connection issue between the client device and the upgrade node, wherein determining that there is the connection issue comprises determining that the upgrade node is multicast enabled and that the client device is not multicast enabled; and wherein providing the alert comprises providing a recommendation to the support agent to enable multicasting on the client device.

10. The upgrade monitoring system of claim 9, wherein determining that the upgrade node is multicast enabled comprises determining that the upgrade node is using an internet protocol (IP) address reserved for multicasting.

11. The upgrade monitoring system of claim 10, wherein determining that the client device is not multicast enabled is based on receiving a response to executing a network configuration command on the client device.

12. The upgrade monitoring system of claim 9, wherein identifying the support agent is based on a group identification associated with the client device.

* * * * *